US009880040B2

(12) United States Patent
Arai et al.

(10) Patent No.: US 9,880,040 B2
(45) Date of Patent: Jan. 30, 2018

(54) FLOW SENSOR

(71) Applicant: Hitachi Automotive Systems, Ltd., Hitachinaka-shi, Ibaraki (JP)

(72) Inventors: Satoshi Arai, Tokyo (JP); Shigeharu Tsunoda, Tokyo (JP); Shinobu Tashiro, Hitachinaka (JP); Takeshi Morino, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 192 days.

(21) Appl. No.: 14/770,169

(22) PCT Filed: Feb. 7, 2014

(86) PCT No.: PCT/JP2014/052832
§ 371 (c)(1),
(2) Date: Aug. 25, 2015

(87) PCT Pub. No.: WO2014/156323
PCT Pub. Date: Oct. 2, 2014

(65) Prior Publication Data
US 2016/0025542 A1    Jan. 28, 2016

(30) Foreign Application Priority Data

Mar. 25, 2013    (JP) ................................ 2013-061298

(51) Int. Cl.
*G01F 15/14*    (2006.01)
*G01F 1/684*    (2006.01)
(Continued)

(52) U.S. Cl.
CPC .......... *G01F 15/14* (2013.01); *B29C 65/1635* (2013.01); *B29C 65/1654* (2013.01);
(Continued)

(58) Field of Classification Search
USPC ......................................................... 73/273
See application file for complete search history.

(56) References Cited

U.S. PATENT DOCUMENTS

| 2004/0261940 A1* | 12/2004 | Arai | ........................ B29C 66/54 |
| | | | 156/272.8 |
| 2005/0145330 A1* | 7/2005 | Shubinsky | .......... B29C 65/1635 |
| | | | 156/272.8 |

(Continued)

FOREIGN PATENT DOCUMENTS

| JP | 11-258019 A |   | 9/1999 |
| JP | 11258019 A | * | 9/1999 |

(Continued)

OTHER PUBLICATIONS

International Search Report (PCT/ISA/210) dated Mar. 25, 2014 with English-language translation (four (4) pages).

*Primary Examiner* — Clayton E Laballe
*Assistant Examiner* — Warren K Fenwick
(74) *Attorney, Agent, or Firm* — Crowell & Moring LLP

(57) ABSTRACT

Provided is a welding structure which enables external visual checks and has improved stability of bonding properties at a laser weld between a cover and a housing of this flow sensor. This flow sensor is provided with a housing, a cover, a circuit chamber sealed between these and housing electronic components or wiring, and a subpassage through which the fluid flows that is to be sensed, and is characterized in that at least the part near the gate section of the cover that transmits the laser is thinner than the other parts that transmit the laser.

18 Claims, 19 Drawing Sheets

(51) Int. Cl.
  *G01F 5/00* (2006.01)
  *B29C 65/00* (2006.01)
  *B29L 31/34* (2006.01)
  *B29C 65/16* (2006.01)
  *B29K 105/00* (2006.01)

(52) U.S. Cl.
  CPC .......... *B29C 66/112* (2013.01); *B29C 66/114* (2013.01); *B29C 66/242* (2013.01); *B29C 66/244* (2013.01); *B29C 66/322* (2013.01); *B29C 66/53462* (2013.01); *B29C 66/7352* (2013.01); *G01F 1/684* (2013.01); *G01F 1/6842* (2013.01); *G01F 5/00* (2013.01); *B29C 65/1612* (2013.01); *B29C 65/1677* (2013.01); *B29C 66/124* (2013.01); *B29C 66/71* (2013.01); *B29C 66/7212* (2013.01); *B29C 66/7315* (2013.01); *B29C 66/73776* (2013.01); *B29C 66/73921* (2013.01); *B29C 66/73941* (2013.01); *B29K 2105/0079* (2013.01); *B29K 2995/0046* (2013.01); *B29L 2031/3481* (2013.01)

(56) References Cited

U.S. PATENT DOCUMENTS

| | | | |
|---|---|---|---|
| 2005/0279738 A1* | 12/2005 | Itakura | B29C 66/73921 219/121.64 |
| 2008/0069997 A1* | 3/2008 | Sugawara | B29C 65/1635 428/58 |
| 2010/0224468 A1* | 9/2010 | Matsuhashi | B29C 65/1635 200/293 |
| 2015/0377670 A1* | 12/2015 | Arai | G01F 1/684 73/202 |

FOREIGN PATENT DOCUMENTS

| | | | | |
|---|---|---|---|---|
| JP | 2002-67165 A | | 3/2002 | |
| JP | 2002067165 A | * | 3/2002 | ......... B29C 65/1635 |
| JP | 2004-209916 A | | 7/2004 | |
| JP | 2005-14319 A | | 1/2005 | |
| JP | 2007-210203 A | | 8/2007 | |
| JP | 2009-56722 A | | 3/2009 | |
| JP | 2010-201920 A | | 9/2010 | |
| JP | 2010-214730 A | | 9/2010 | |
| JP | 2010201920 A | * | 9/2010 | ......... B29C 65/1635 |

* cited by examiner

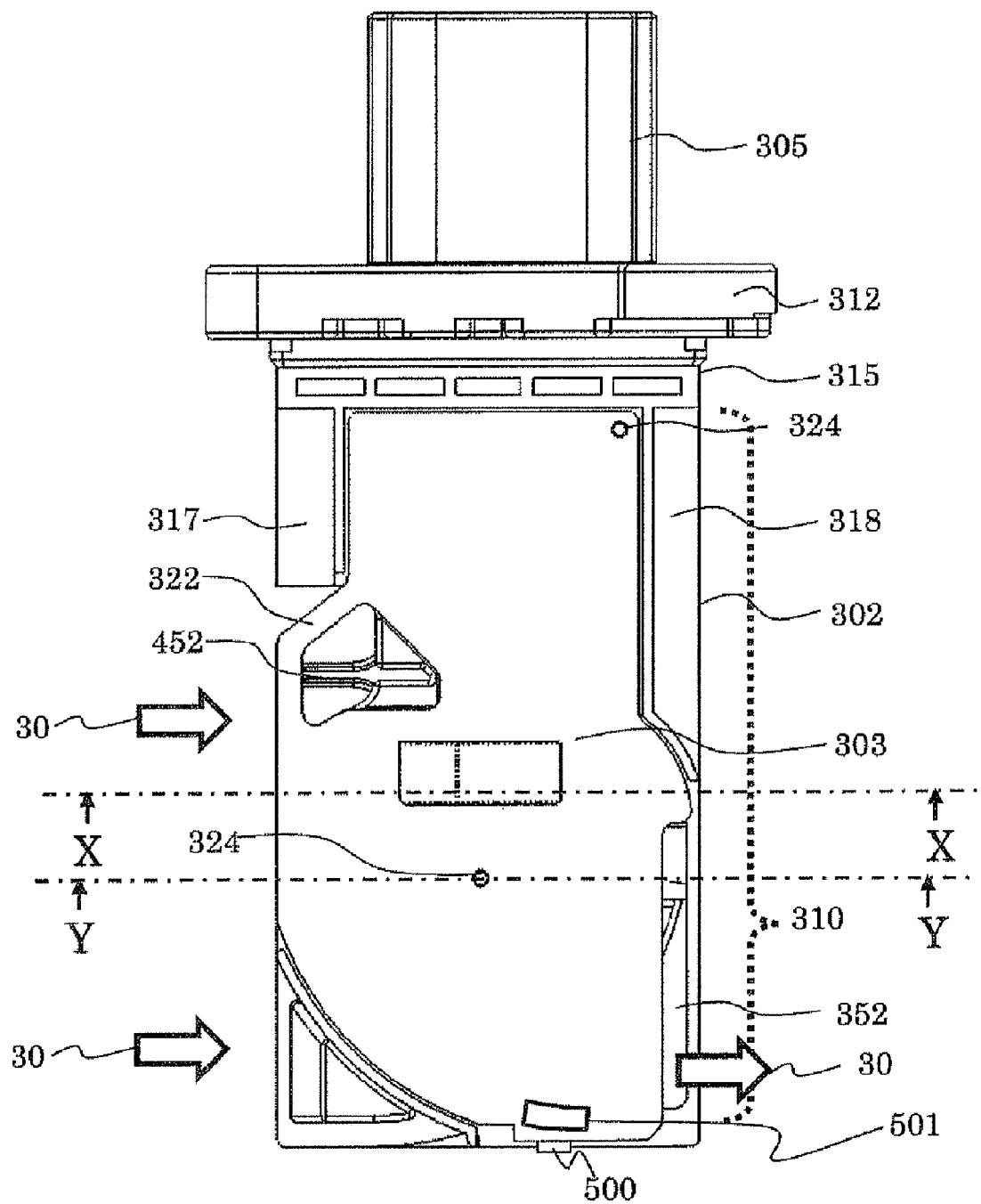

FLOW SENSOR

TECHNICAL FIELD

The present invention relates to a flow sensor and a manufacturing method therefor. Further, the present invention relates to a joining structure of both plastics using laser welding and a method therefor.

BACKGROUND ART

In Patent Literature 1 (JP-A-2002-67165), disclosed is a method for providing a concave part on a laser irradiation part on a transmitting resin side, shortening a transmission distance, and making welding effectively as a method for making laser welding of a housing for storing measurement devices and a cover for covering them in a measuring instrument such as a thermal type flow meter. Further, in Patent Literature 2 (JP-A-2009-056722), disclosed is a method for providing an opening on a transmitting resin side and determining welding in a state in which a welded part is evaginated as a method for inspecting a laser welded part.

CITATION LIST

Patent Literature

PATENT LITERATURE 1: JP-A-2002-67165
PATENT LITERATURE 2: JP-A-2009-056722

SUMMARY OF INVENTION

Technical Problem

A flow sensor includes a flow rate detection unit and a temperature detection unit, and they are arranged on a housing (chassis). Further, various electronic components are mounted in a circuit chamber provided in the housing. In order to prevent short circuit, corrosion, or the like of a wiring unit etc, the housing and a cover need to be sealed. As a method for directly connect the cover and the housing precisely without giving damages to electronic components, a laser welding method is used. However, according to investigations of the inventor, as a problem, it is revealed that when a cover made of PBT resin is molded by a conventional laser welding method, since a transmittance near a gate is as low as a half or less of the transmittances of other portions, it is necessary to adjust laser power or suppress a speed and it is difficult to make stable welding because of complicated control. Further, as a problem, it is revealed that since a transmittance is low near the gate, an appearance inspection of the welding cannot be performed using images. In Patent Literature 1, disclosed is that the transmission distance is shortened, and the laser irradiation part is in a concave state by this method. When crystalline resins having lots of scattering like PBT are used, an effect of the scattering increases and a heat input distribution of laser also is unstable. Based on the above, it is revealed that there arises a problem that a welded state is unstable particularly in end portions of a laser spot.

In the inspection method disclosed in Patent Literature 2, there arises a problem that since a large amount of pyrolytic component (gas) is generated from that portion, pressurizing materials become tainted, cleaning has to be always performed, and productivity is largely reduced.

In view of the foregoing, it is an object of the present invention to provide a laser welding structure of a cover and a housing in which productivity is improved and a low cost is implemented while maintaining high quality and high reliability of a flow sensor without causing these new problems.

Solution to Problem

To solve the above problems, for example, a configuration described in a scope of claims is adopted. The present invention includes a means for solving the above problems in plurality, and one example is taken. A flow sensor includes a housing, a cover, a circuit chamber that is sealed between the housing and the cover and has electronic components and wiring parts built-in, and a sub-passage part through which a fluid flows that is to be sensed, and is characterized in that at least a thickness of one portion that transmits laser light near a gate part of the cover is thinner than thicknesses of the other portions that transmit the laser light.

Advantageous Effects of Invention

By an adoption of the present invention, provided is a low-cost flow sensor that has high quality and high reliability.

BRIEF DESCRIPTION OF DRAWINGS

FIG. 2(B) A front view illustrating an appearance of the flow sensor;

DESCRIPTION OF EMBODIMENTS

First Embodiment

Figure 1:
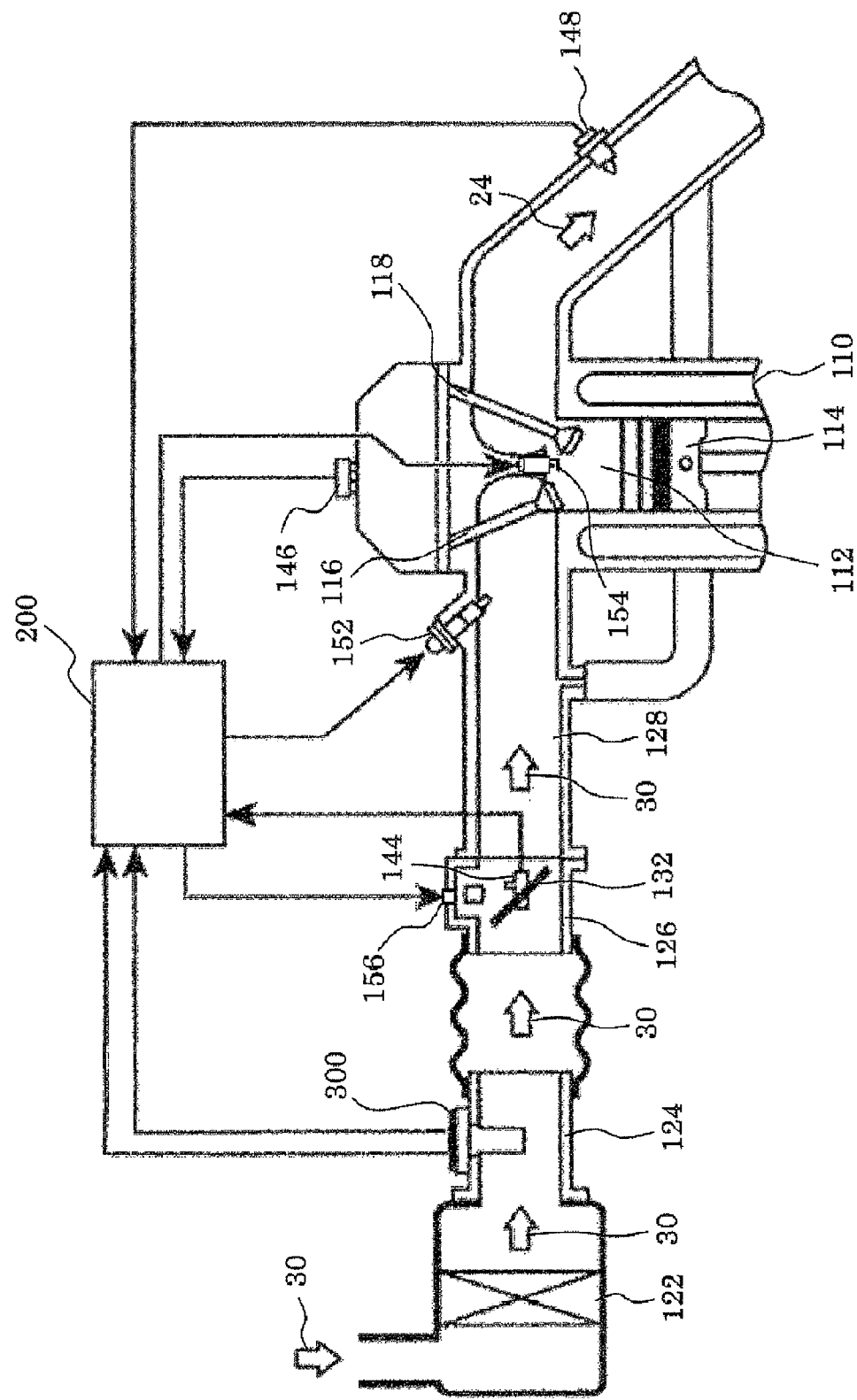
FIG. 1 An overall view of an internal combustion engine control system using a flow sensor of the present invention.

An internal combustion engine control system including a flow sensor of the present invention will be described with reference to FIG. 1. Based on operations of an internal combustion engine 110 including an engine cylinder 112 and an engine piston 114, air is inhaled and it is gas to be measured 30 that is measured by a thermal type flow sensor 300 of the present invention. The inhaled gas to be measured 30 flows through an air cleaner 122 and is guided to a combustion chamber of the engine cylinder 112 via a main passage 124, a throttle body 126, and an intake manifold 128. Based on a flow rate measured by the thermal type flow sensor 300, fuel is supplied from a fuel injection valve 152 and is guided to the combustion chamber in a state of an air-fuel mixture together with the gas to be measured 30. The present embodiment will be described by using a system in which fuel is injected to an intake port of the internal combustion engine as illustrated in FIG. 1, namely, a so-called engine of a premix type. The thermal type flow sensor 300 of the present invention is not limited thereto, and is applicable also to a direct injection type in which fuel is directly injected to each combustion chamber.

The fuel and air guided to the combustion chamber form a mixing state of the fuel and air. By spark ignition of a spark plug 154, the fuel and air burn explosively and generate mechanical energy. The gas after the combustion is guided to an exhaust pipe from an exhaust valve 118 and is exhausted as exhaust air 24 to an outside of a vehicle from the exhaust pipe. An amount of intake air guided to the combustion chamber is controlled by a throttle valve 132 in conjunction with an accelerator pedal. The amount of fuel to be supplied is controlled based on the intake air amount, and a driver controls the opening degree of the throttle valve 132 to control the intake air amount. The process permits mechanical energy generated by the internal combustion engine to be controlled.

The flow rate and the temperature of the gas to be measured 30 that is taken from the air cleaner 122 and flows through the main passage 124 is measured by the thermal type flow sensor 300, and measured values thereof are input to a control device 200. Further, an output from a throttle angle sensor 144 that measures the opening degree of the throttle valve 132 is input to the control device 200. Further, positions and states of the engine piston 114, an intake valve 116, and the exhaust valve 118 are input to the control device 200. In addition, to measure a rotating speed of the internal combustion engine, an output from a rotation angle sensor 146 is input to the control device 200. To measure a state of a mixing ratio between the amount of fuel and the amount of air based on a state of the exhaust air 24, an output from an oxygen sensor 148 is input to the control device 200.

The control device 200 calculates a fuel injection amount and an ignition timing based on the intake air amount being an output from the thermal type flow sensor 300 and the rotating speed of the internal combustion engine. Based on the calculation results, the amount of fuel supplied from the fuel injection valve 152 and the ignition timing in which ignition is performed by the spark plug 154 are controlled. Further, the amount of fuel to be supplied and the ignition timing are minutely controlled in practice based on a changed state of the intake air temperature and the throttle angle measured by the thermal type flow sensor 300, a changed state of an engine rotating speed, and a state of an air-fuel ratio measured by the oxygen sensor 148. In an idle operating state of the internal combustion engine, the control device 200 further controls the amount of air that bypasses the throttle valve 132 by using an idle air control valve 156, and controls a rotating speed of the internal combustion engine in the idle operating state.

Figure 2A:
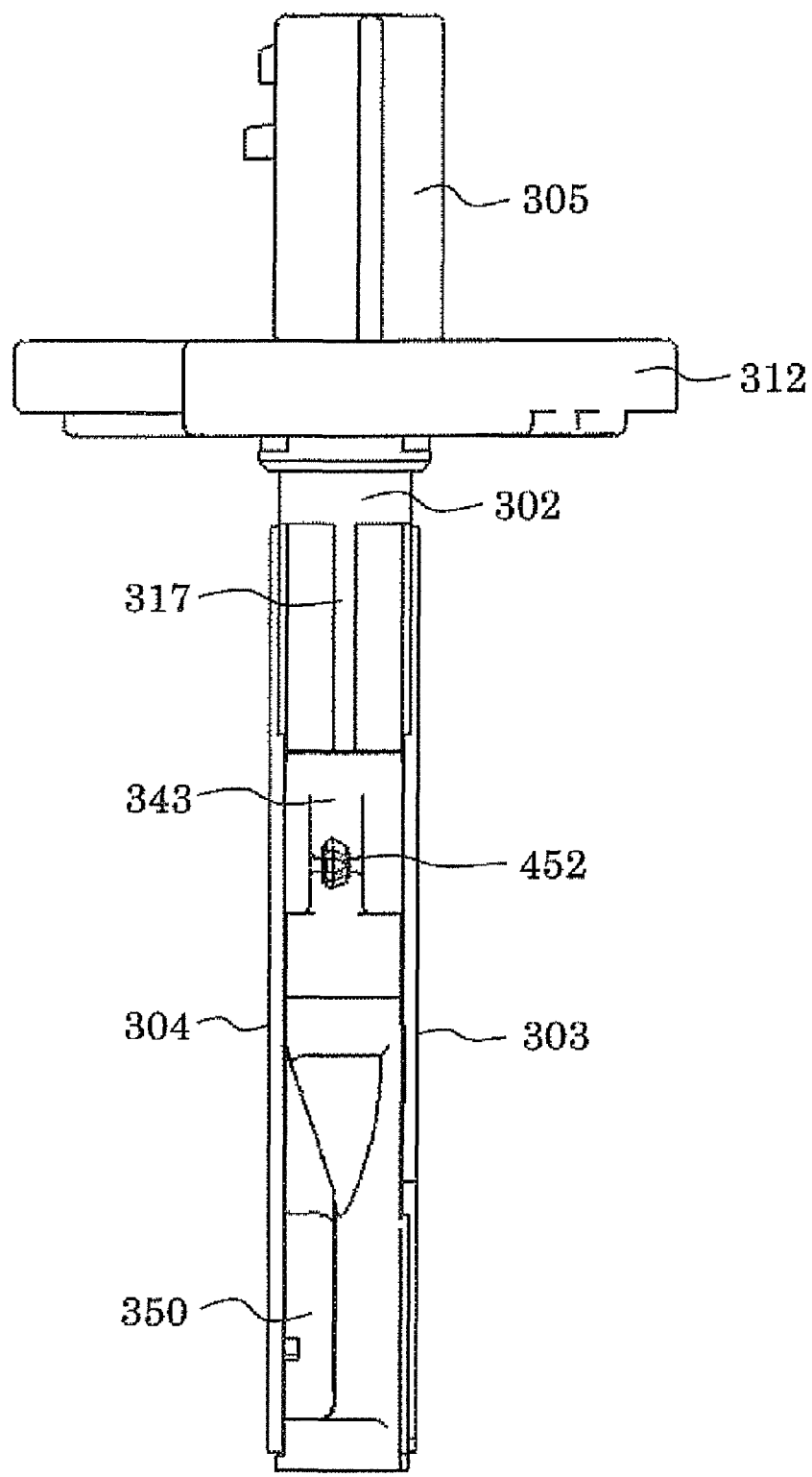
FIG. 2(A) A left side view illustrating an appearance of the flow sensor.
Figure 3A:
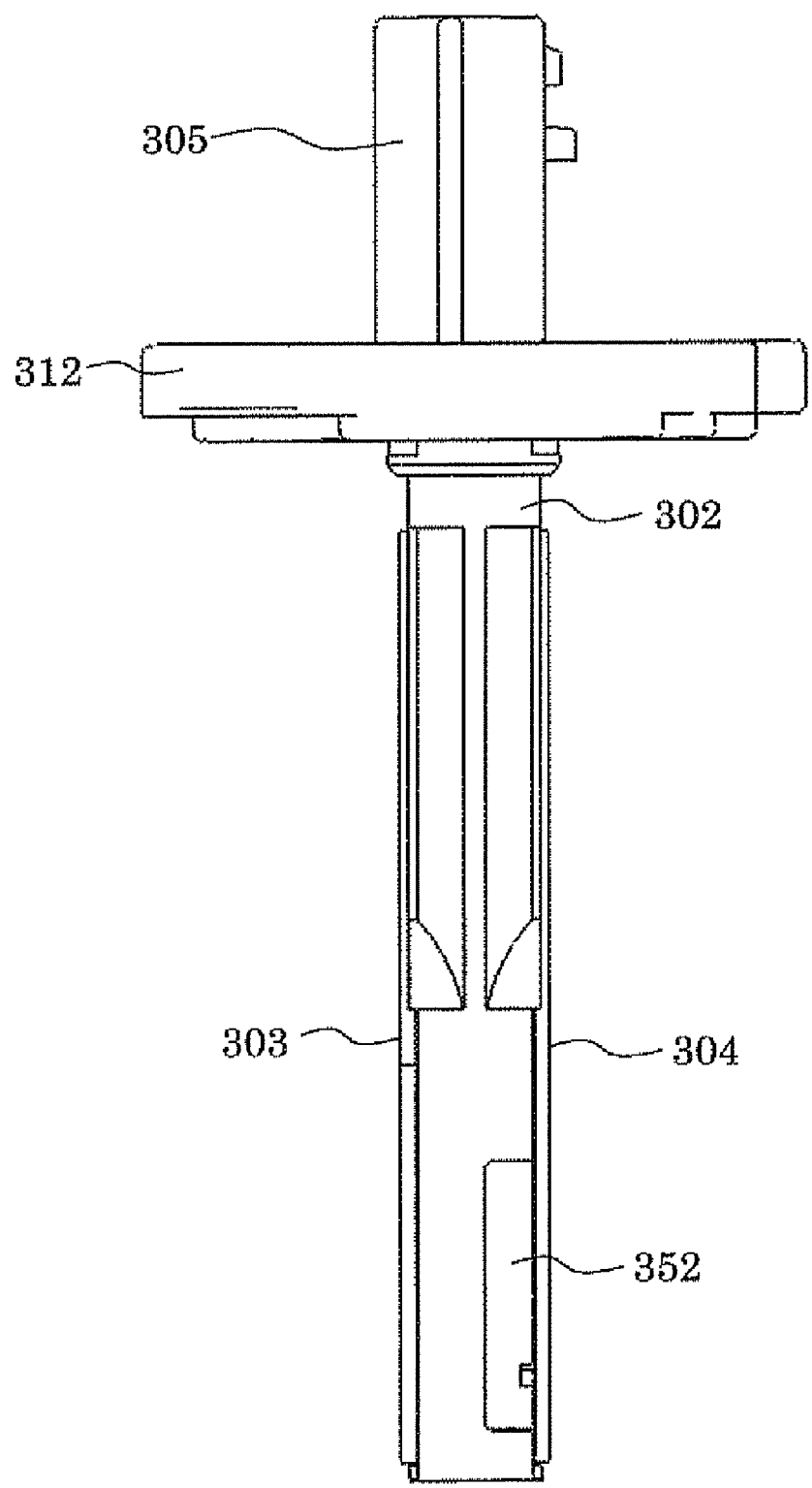
FIG. 3(A) A right side view illustrating an appearance of the flow sensor.

Next, an appearance structure of the thermal type flow sensor 300 will be described with reference to FIGS. 2 and 3. FIG. 2(A), FIG. 2(B), FIG. 3(A), and FIG. 3(B) illustrate a left side view, a front view, a right side view, and a back view of the thermal type flow sensor 300, respectively.

The thermal type flow sensor 300 includes a housing 302, a front cover 303, and a rear cover 304. The housing 302 includes a flange 312 for fixing the thermal type flow sensor 300 on the main passage 124, an external connection part 305 having an external terminal for providing electrical connection with an external device, and a measuring unit 310 that measures a flow rate or the like. In the measuring unit 310, a sub-passage groove for making a sub-passage is provided. Further, as illustrated in FIGS. 4 and 5, in the measuring unit 310, provided is a circuit package 400 including a flow rate detection unit that measures a flow rate of the gas to be measured 30 flowing through the main passage 124 and a temperature detection unit 452 that measures a temperature of the gas to be measured 30 flowing through the main passage 124.

Figure 4A:
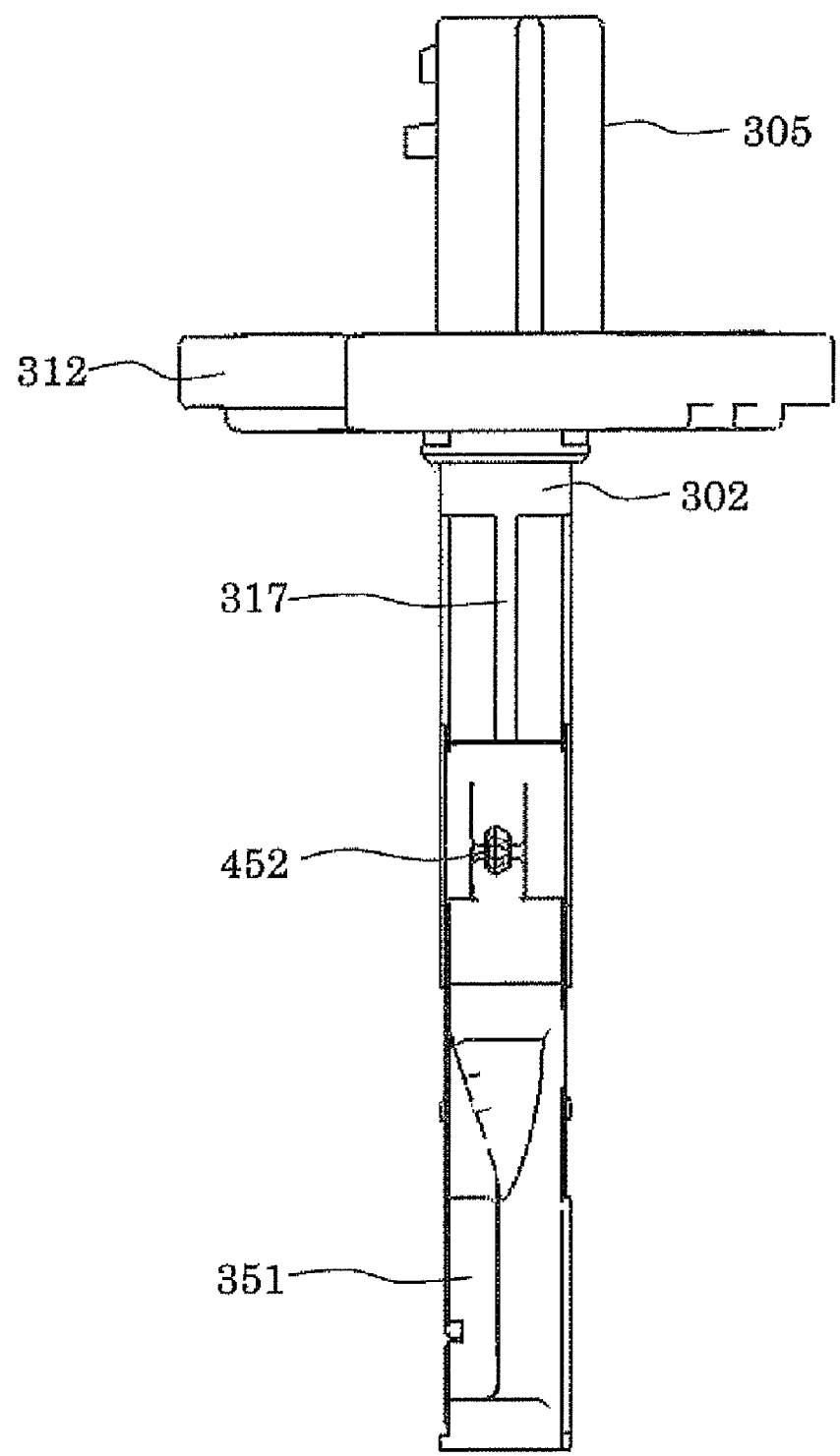
FIG. 4(A) A left side view of a housing of the flow sensor.
Figure 4B:
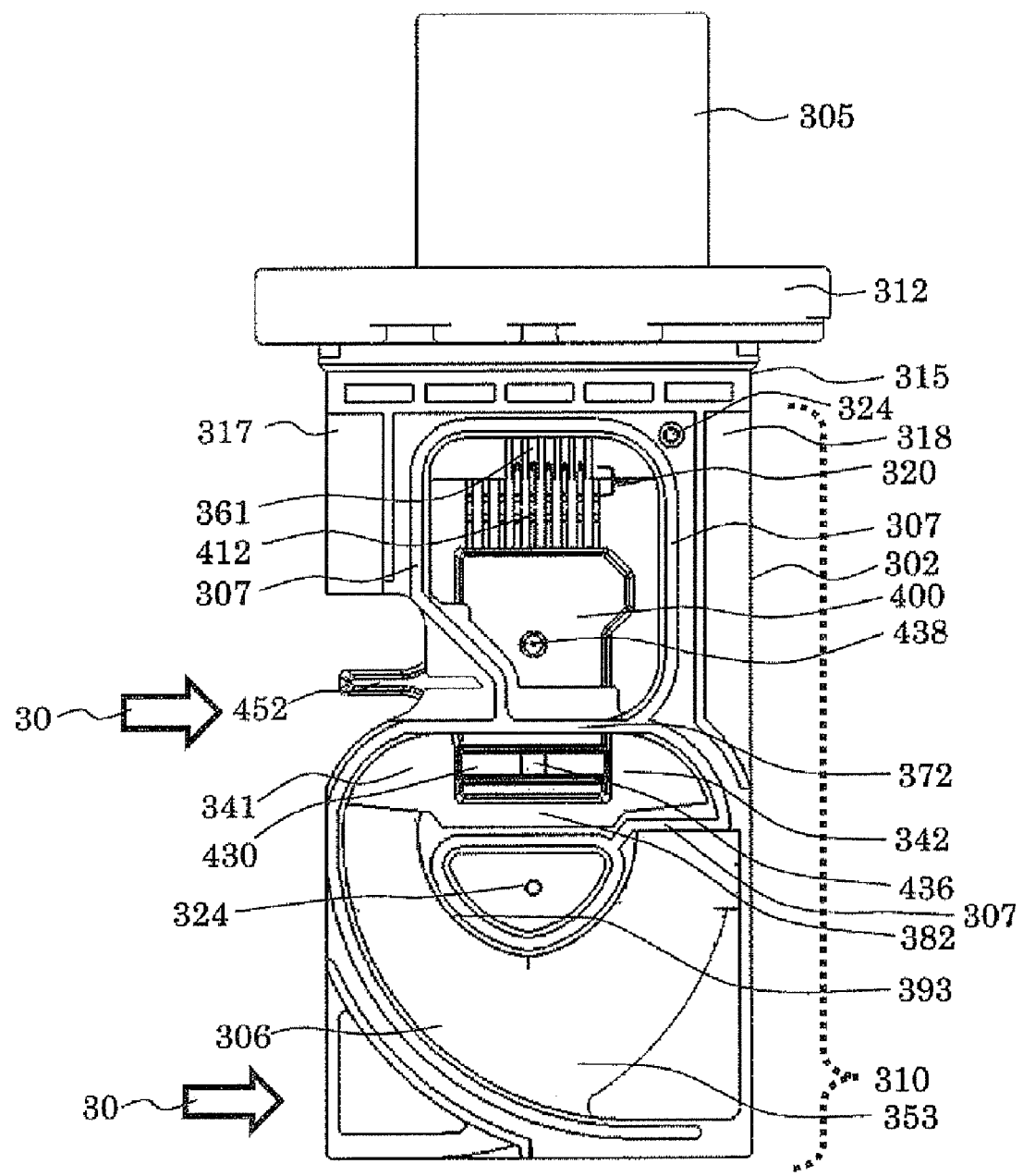
FIG. 4(B) A front view of the housing of the flow sensor.
Figure 5A:
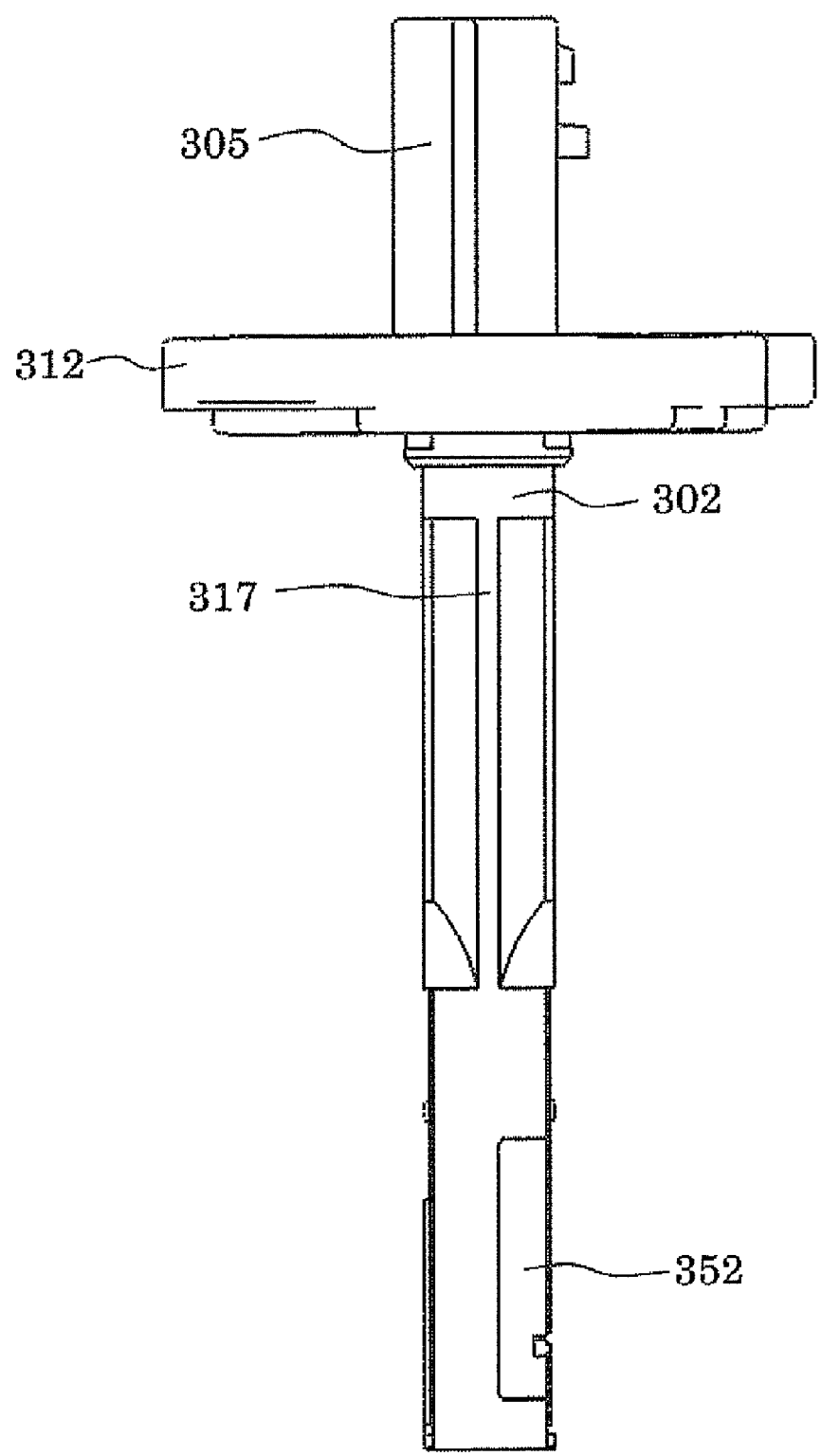
FIG. 5(A) A right side view of the housing of the flow sensor.
Figure 5B:
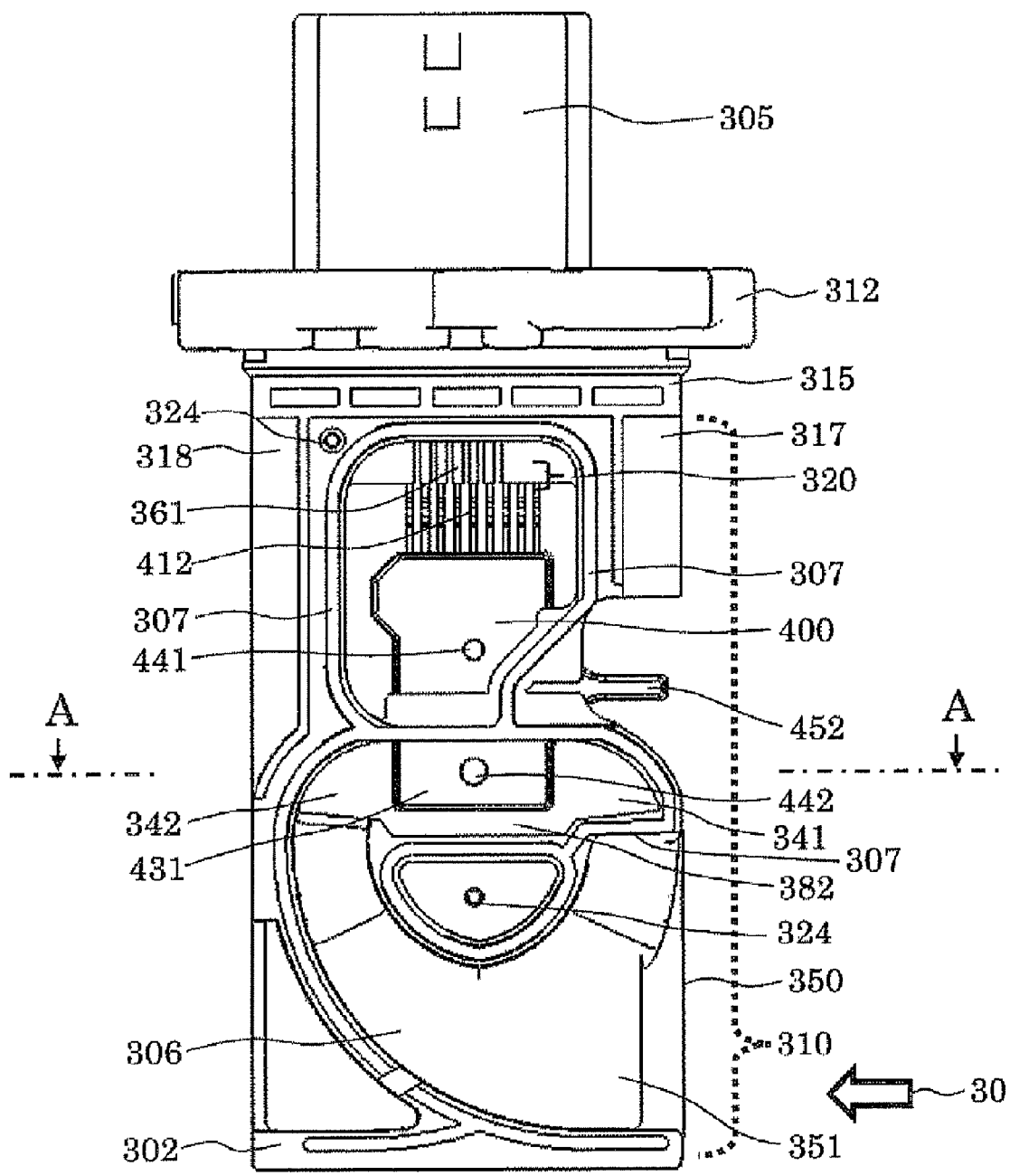
FIG. 5(B) A back view of the housing of the flow sensor.

Next, an internal structure of the thermal type flow sensor 300 will be described with reference to FIGS. 4 and 5 illustrating states of the housing 302 from which the front cover 303 and the rear cover 304 are detached. FIG. 4(A) is a left side view of the housing of the flow sensor, and FIG. 4(B) is a front view thereof. FIG. 5(A) is a right side view of the housing of the flow sensor, and FIG. 5(B) is a back view thereof. In FIGS. 4(A) and 4(B), the sub-passage groove 306 for molding the sub-passage is provided on the housing 302. A projecting part 307 in which the covers are disposed on a front surface and a rear surface of the housing 302 and that is disposed near the sub-passage groove 306, the front cover 303, and the rear cover 304 are welded by laser to thereby complete the sub-passage.

In FIGS. 5(A) and 5(B), a part of the gas to be measured 30 flowing through the main passage 124 is taken in the rear sub-passage groove 306 from an inlet groove 351 for molding an inlet 350 and flows through the rear sub-passage groove 306. The rear sub-passage groove 306 has a shape in which the groove thereof is deeper as advancing through the groove more. As flowing through the groove more, the gas to be measured 30 moves more gradually to a direction of the front side. Particularly, the rear sub-passage groove 306 is provided with a steep slope part that is drastically deepened in an upstream part 342 of the circuit package 400. A part of air in which mass is small moves along the steep slope part and, in the upstream part 342 of the circuit package 400, the air flows through a measuring flow passage surface 430 illustrated in FIG. 4(B). On the other hand, foreign materials in which mass is large move along a rear measuring flow passage surface 431 illustrated in FIG. 5(B) since it is difficult to rapidly change a course because of an inertia force. Thereafter, the foreign materials move along a downstream part 341 of the circuit package 400 and flow through the measuring flow passage surface 430 illustrated in FIG. 4(B). With that, the appearance structure and the internal structure of the thermal type flow sensor 300 are described.

Next, a laser welding method for the housing and the covers according to the present invention will be described with reference to FIGS. 2 to 7. The laser welding method is a method for irradiating laser, in a state in which a light-transmitting resin and a light-absorbing resin are overlapped, through the light-transmitting resin, melting a portion in which the light-absorbing resin has contact with the light-transmitting resin, and further melting the light-transmitting resin by heat transmitted from the light-absorbing resin to be brought into contact with the light-absorbing resin. Because of the above-described welding principle, a natural material containing no coloring agent is preferably used as the light-transmitting resin for the covers 303 and 304. On the other hand, preferably, into materials used as the light-absorbing resin for the housing 302, carbon black is contained and the materials are colored into black. In addition, for the housing 302 and the covers 303 and 304 of the present invention, polybutylene terephthalate (PBT), polyphenylene sulfide (PPS), nylon 6 (PA6), nylon 66 (PA66), nylon 6T (PA6T), or the like being crystalline resins having high heat resistance is assumed.

Further, in the thermal type flow sensor 300 of the present invention, high dimensional precision and dimensional stability are particularly required for the housing 302 side, and therefore glass materials of approximately 20 to 40% are added in many cases. However, laser transmission tends to be deteriorated by the addition of the glass materials. Therefore, an addition rate of glass fiber of thermoplastic resins composing the housing 302 is preferably equal to or greater than that of the thermoplastic resins composing the covers 303 and 304.

Further, in crystalline thermoplastic resins, as a tool temperature during molding is lower, crystallinity is lower and a transmission factor is higher. Therefore, the crystallinity of the thermoplastic resins composing the housing 302 is preferably equal to or greater than that of the thermoplastic resins composing the covers 303 and 304.

Further, from the standpoint of the dimensional precision, not only the glass fiber to be added but also an alloy system containing amorphous resins is preferably used as resin materials of the housing 302.

As a light source used for the laser welding, laser having wavelengths of light in an infrared region including semiconductor laser, YAG laser, and fiber laser is effective in terms of costs. Further, laser having other wavelengths may be used in accordance with the absorption of resins. Further, an intensity distribution of laser light sources can be converted to various intensity distributions based on a lens belonging to Gaussian type, top-hat type, ring type, or the like. However, when the top hat type or the ring type is used, the welding can be uniformly made. When laser is irradiated, a laser light source or a product may be physically moved to be welded on a stage, or laser light itself may be controlled and irradiated using a galvanometer mirror.

Next, the laser welding method of the present invention will be described. First, the housing 302 is set at a predetermined position, and the covers 303 and 304 are arranged on the housing 302 with high precision. Thereafter, the covers 303 and 304 and the housing 302 are pressurized by transparent pressurizing materials such as glass or acrylate resin. Laser welding is made around a circuit chamber in a state in which the pressurized state is maintained. Further, the laser welding is made so that the sub-passage is formed.

Here, in conventional laser welding, a transmittance in a portion near a gate part is reduced to half or less as compared to those in the other portions, and therefore it is necessary to adjust laser power or reduce a speed. Further, the control is complicated and stable welding also is difficult. Further, since the transmittance is low near the gate part, a welding state cannot be understood by an appearance of an inspection after the welding.

As a means for improving a transmittance of molded components, it is considered that a material system having a high transmittance is used, a thickness is thinned, and a tool temperature is lowered. In the above, from the standpoint of the fact that the material having the high transmittance is used, according to investigations of the inventor, a crystalline material such as PBT is used in many cases as a material for the covers 303 and 304 of the thermal type flow sensor 300. Further, since a material for lowering a transmittance, such as glass fiber is also contained, it is difficult to raise up the transmittance by the material itself.

Further, from the standpoint of the fact that a thickness is thinned while keeping a thickness of the covers 303 and 304 at a constant, according to the investigations of the inventor, molding conditions are rationalized in consideration of melt viscosity or flow characteristics of PBT resin. As a result, an improvement effect is recognized in the transmittances of portions other than the gate part, but the transmittance of the gate part is kept still low.

Further, from the standpoint of the fact that the tool temperature is lowered by the PBT resin, according to the investigations of the inventor, it is revealed that even if the tool temperature is lowered up to 40° C., the improvement effect of the transmittance is small near the gate part through which molten resin flows. As described above, the improvement effect of the transmittance in a portion near the gate part is small by these methods.

To cope with the problems, as a result of further investigations of the inventor, it is revealed that since a temperature of the resin is high near the gate part, crystallinity is high and the transmittance is low. Further, it is revealed that the resin temperature is high, and thereby sufficient flowability of the resin can be secured even in a portion in which a thickness is thin and the resin can be filled up into fine parts. Further, it is revealed that even if the thickness is slightly thin, the crystallinity is high, and thereby a problem is not fundamentally caused by strength itself. Therefore, it is revealed that in the case in which the PBT resin is used as a cover material, even if a thickness of a concave part is made to be as thin as approximately 0.5 mm only near the gate part, the molding can be performed. Further, it is revealed that a thickness of a portion near the gate part is made to be thinner than those of the other portions, and thereby transmittance variations can be largely reduced based on securement of the strength.

Figure 3B:
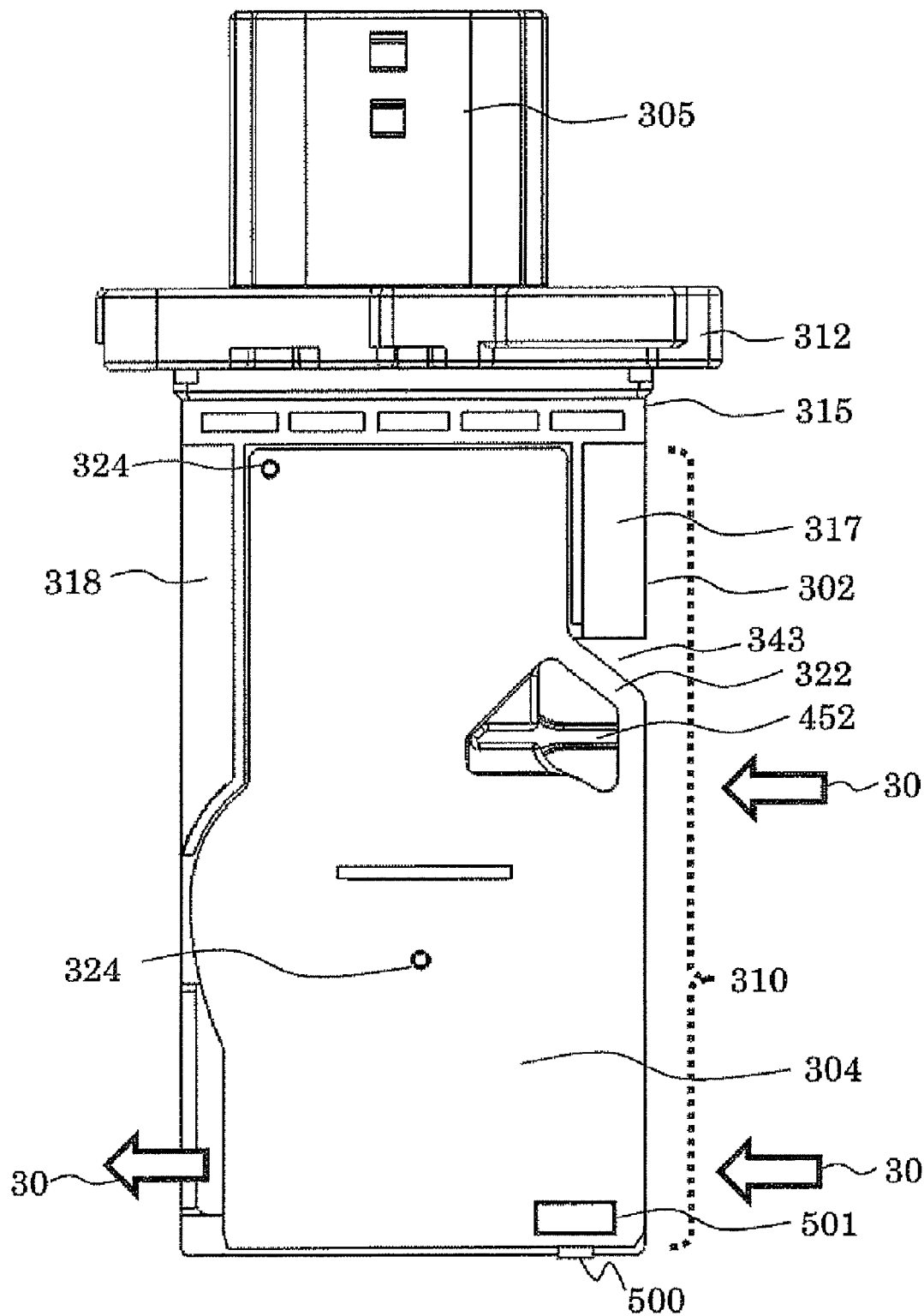
FIG. 3(B) A back view illustrating an appearance of the flow sensor.

To solve the problems, in the present invention, proposed is a flow sensor in which in FIGS. 2(B) and 3(B), concave parts 501 are provided near the gate part of the covers 303 and 304, respectively, and thicknesses of the covers 303 and 304 are made to be thinner than those of other portions. The present embodiment will be described with reference to FIGS. 6(A) and 6(B).

Figure 6A:
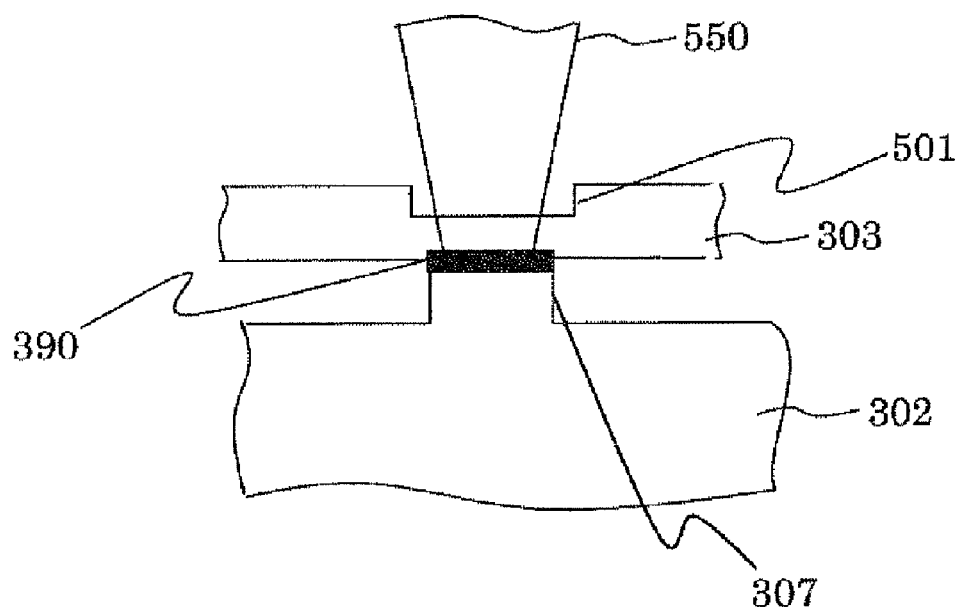
FIG. 6(A) A cross-section view of a welded part illustrated from a vertical direction to a laser scanning direction according to a first embodiment.
Figure 6B:
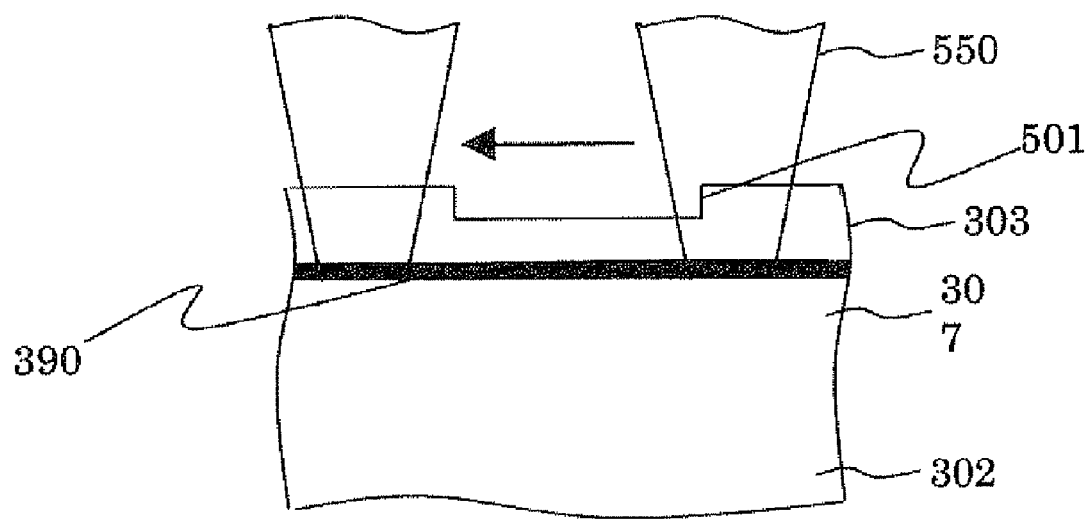
FIG. 6(B) A cross-section view of the welded part illustrated from a direction along the laser scanning direction according to the first embodiment.

FIGS. 6(A) and 6(B) illustrate cross-section views of a laser welded part 390 of the concave part 501 of the front cover 303. FIG. 6(A) illustrates a vertical direction to a laser welding line, and FIG. 6(B) illustrates a direction along the laser welding line.

In FIG. 6(A), the concave part 501 is provided in the front cover 303, and thereby stability of the laser welding in this portion can be improved and an appearance inspection can be performed. An inspection method using the laser welding includes a measuring method using a radiation temperature, a measuring method using optical interference, an inspection method using an appearance, and the like. As a method for directly determining quality of a welded state in a short tact, the appearance inspection is a most effective method.

In addition, in general laser welding, a wavelength in an infrared region is used in many cases. In this case, the transmittance is set to 20% or more, and thereby the preferable welded part 390 can be formed. Further, in order to grasp a state of the welded part 390 by the appearance, a necessary wavelength region is a visible light region and a transmittance largely greater than that required for the laser welding is necessary. Particularly, in the case in which the appearance inspection is performed using a CCD, a necessary wavelength region is 450 to 750 nm in many cases. In the case in which the transmittance is set to 30%, detection cannot be performed as much as 20% or a large void cannot be detected. On the other hand, in the case in which the transmittance is set to 35% or more, a probability of the detection is 100% and a large void can be observed.

Further, in the case in which the transmittance in a portion corresponding to the welded part 390 other than the gate part of the covers 303 and 304 also is made to be high, through the welded part 390 and the covers 303 and 304, gradations of the housing 302 are hard to create and an image is hard to inspect in some cases. In such a case, the thicknesses of the covers 303 and 304 are set so that the transmittance in the covers 303 and 304 of a portion in which the welding is not made near the welded part 390 is set to 20% or less in which the appearance observation of the welded part 390 cannot be perfectly performed, and thereby an image of the welded part 390 is easy to inspect. That is, a ratio between the thicknesses of the covers 303 and 304 is set so that a difference between the transmittance in the covers 303 and 304 of the welded part 390 and the transmittance in the portion other than the welded part 390 is set to 15% or more. Thereby, it is possible to perform a preferable appearance inspection using the images. In the laser welding, it is sufficient to just consider the transmittance in only a wavelength region of the laser light source. In addition, in the appearance inspection, because of dependence on sensitivity of a CCD etc, not only the transmittance in an infrared wavelength region but also that in a visible light region is preferably high.

Figure 7:
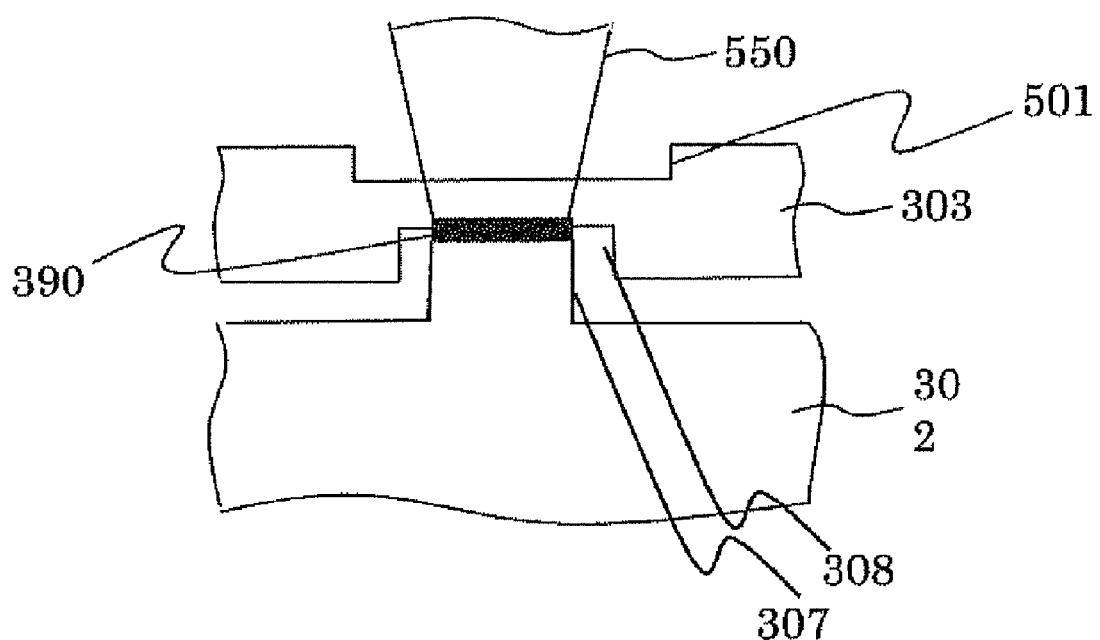
FIG. 7 A cross-section view of the welded part illustrated from a vertical direction to the laser scanning direction according to a second embodiment.

Further, to realize stable welding, the concave portions 501 provided in the covers 303 and 304 on the laser irradiation side illustrated in FIGS. 6(A), 6(B), and 7 need to be made to be greater than the projecting part 307 formed on the housing 302. The projecting part 307 formed on the housing 302 is preferably provided in all places of the welded part 390.

Second Embodiment

A second embodiment of the present invention will be described with reference to FIG. 7. In the present embodiment, not only the concave part 501 is proved in a laser irradiation surface of the front cover 303 but also the concave part 308 is provided in the front cover 303 on a joining surface side with the housing 302.

Also in that case, the concave part 308 provided in the joining surface of the front cover 303 is preferably provided in all places of the welded parts 390.

Figure 8:
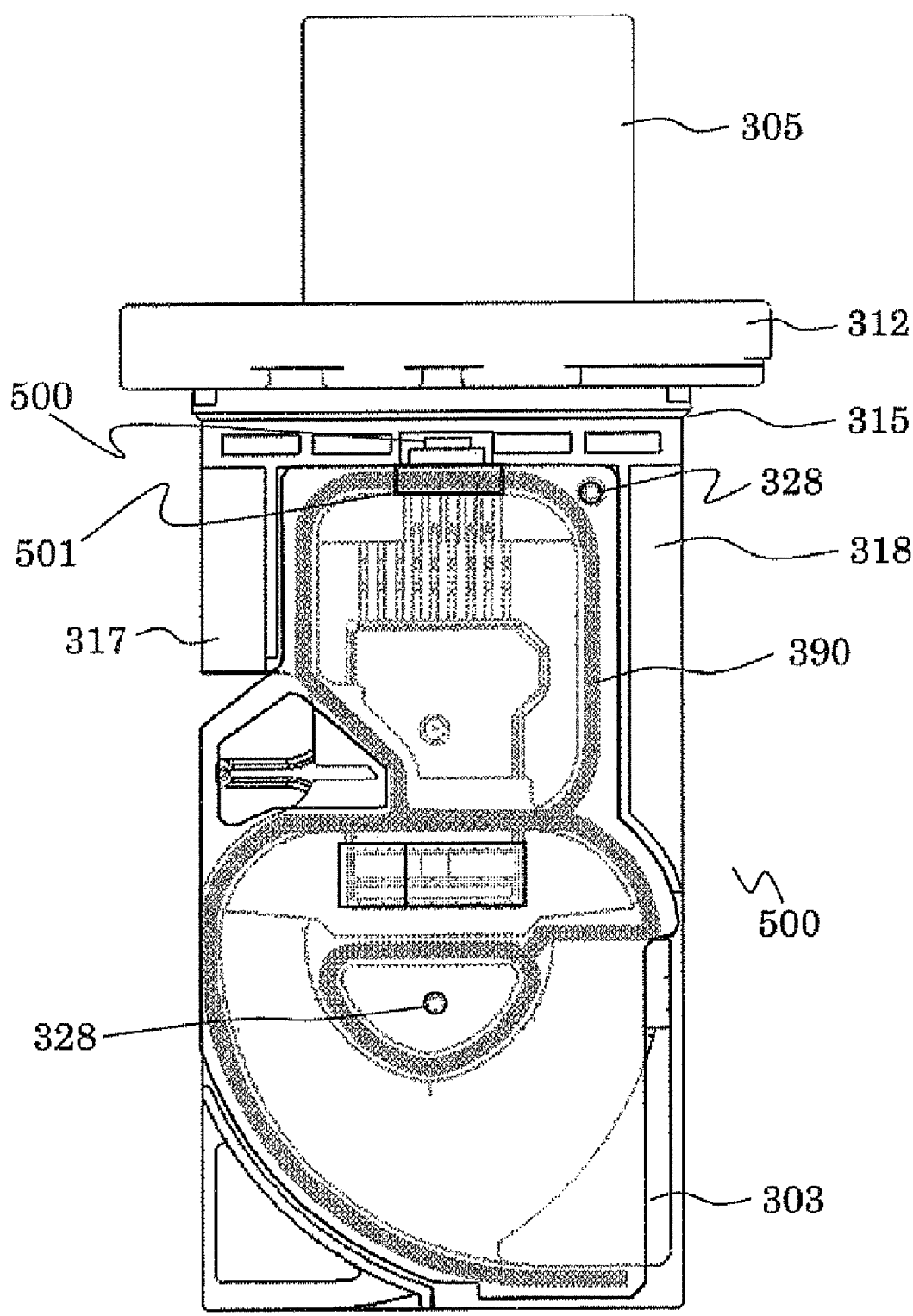
FIG. 8 A front view of the housing of the flow sensor according to a third and a fourth embodiment.

In the case in which a gate part is set to a side gate in which a gate part is located on a side surface of a product, a gate position may be provided in any place in the longitudinal direction of the front cover 303 in order to make high a flatness of the front cover 303. Therefore, the gate part may be arranged not on a passage side but on a circuit chamber side near the flange 312. In that case, like FIG. 8, it is sufficient to just provide the concave part 501 in the front cover 303 on the circuit chamber side.

Third Embodiment

Figure 9:
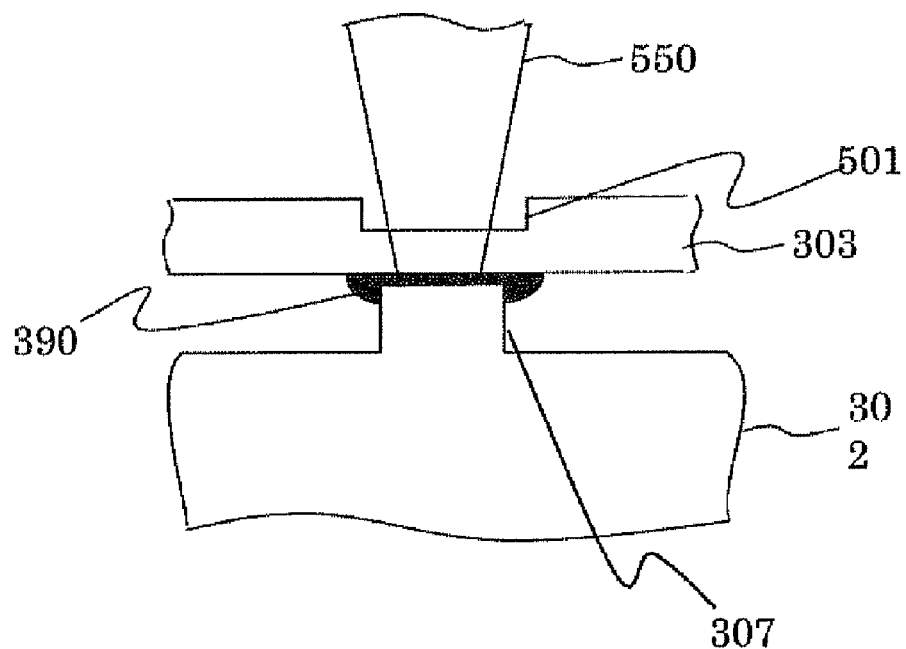
FIG. 9 A cross-section view of a concave part 501 illustrated from a vertical direction to the laser scanning direction according to the third embodiment.

A third embodiment of the present invention will be described with reference to FIG. 9. In the present embodiment, a burr is provided in the welded part 390, and FIG. 9 illustrates a cross-section view in the vertical direction to the welding line. The crystallinity is high near the gate part in which the concave part 501 is provided in the laser irradiation part of the front cover 303. Therefore, the front cover 303 near the gate part is higher in the strength than the other welded parts, and a thickness of the front cover 303 is thinner than those of the other welded parts 390. Therefore, in the case in which the thickness is reduced to half or less, this may cause problems in terms of the strength. Like the present embodiment, a burr is provided in the welded part 390, and thereby a stress relaxation function and an improvement in the strength can be realized at the same time.

Fourth Embodiment

Figure 10:
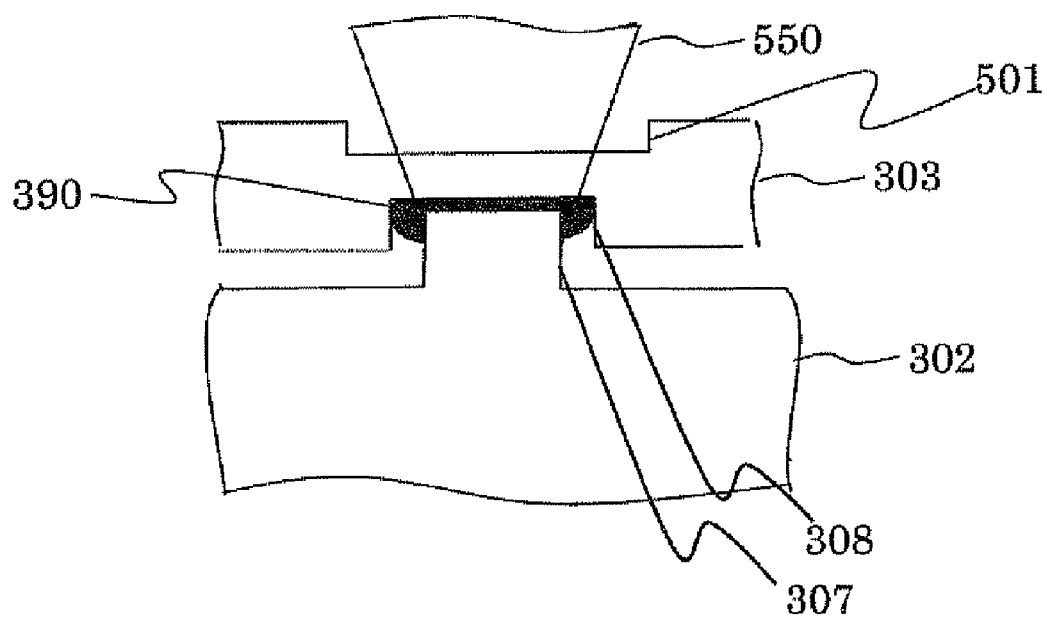
FIG. 10 A cross-section view of the concave part 501 illustrated from a vertical direction to the laser scanning direction according to the third embodiment.

A fourth embodiment of the present invention will be described with reference to FIG. 10. When the large burr is extended to a passage part in the third embodiment, characteristic variations of the thermal type flow sensor 300 are increased. Therefore, like FIG. 10 in the present embodiment, the concave part 308 is provided in the front cover 303 on the joining surface side with the housing 302 to store the burr in the inside of the concave part 308. In addition, the burr in the present embodiment may be formed in the laser welded part 390 other than a portion in which the concave part 501 is formed in the laser irradiation surface, and further the burr may be formed in all portions.

A spot size of the laser light 550 is made to be greater than the projecting part 307 formed on the housing, and thereby the burr of the present embodiment can be formed. Like FIG. 11, a width of the laser welded part 390 in only a portion corresponding to the concave part 501 of the front cover 303 is made to be great to thereby improve the strength.

Fifth Embodiment

Figure 11:
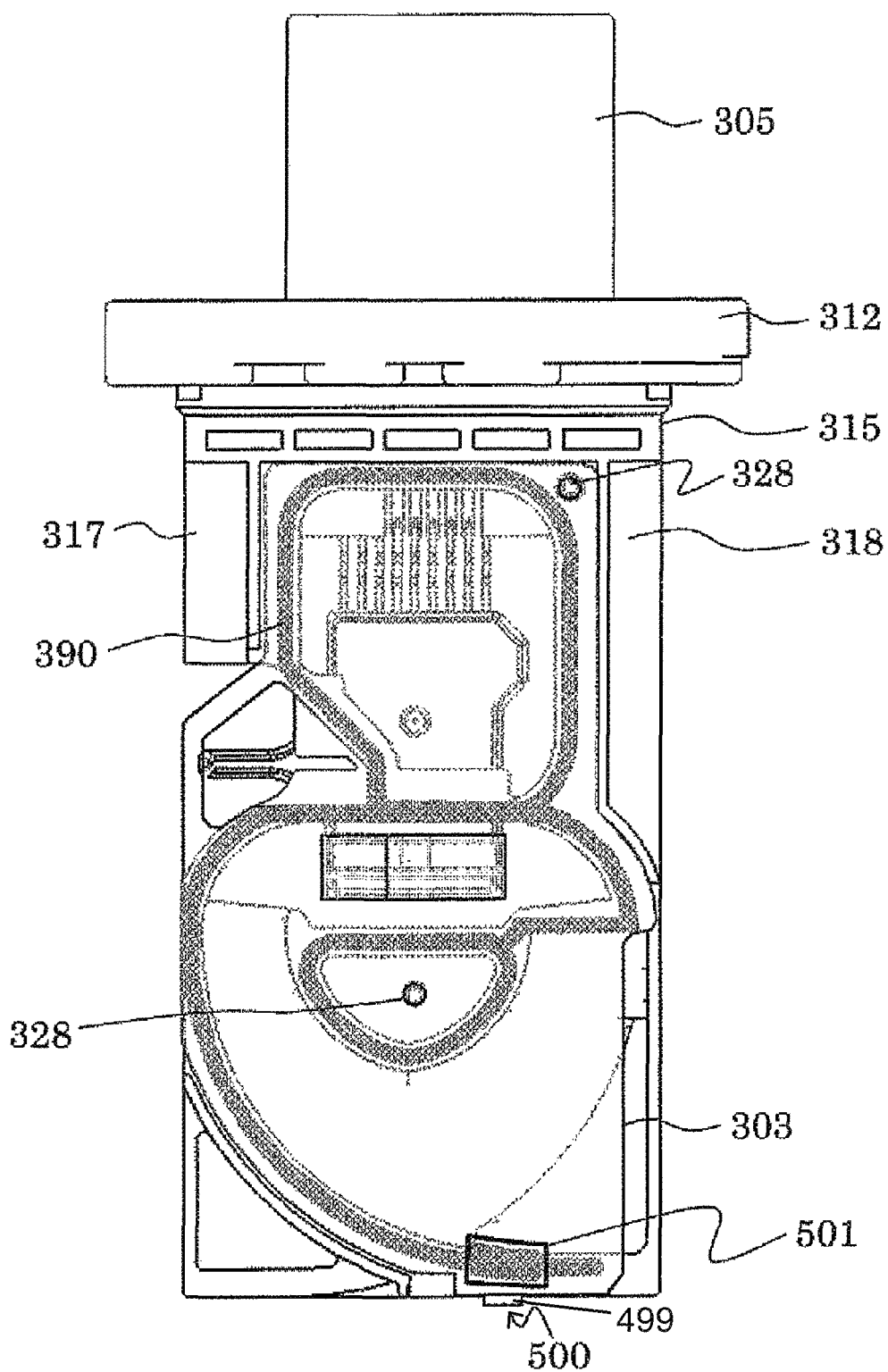
FIG. 11 A front view of the housing of the flow sensor according to a fifth embodiment.

In FIG. 11, a gate part 499 is shown, where the plastic of a forepart of resin that flows out can be cut, which is the gate cut part 500.

Figure 12:
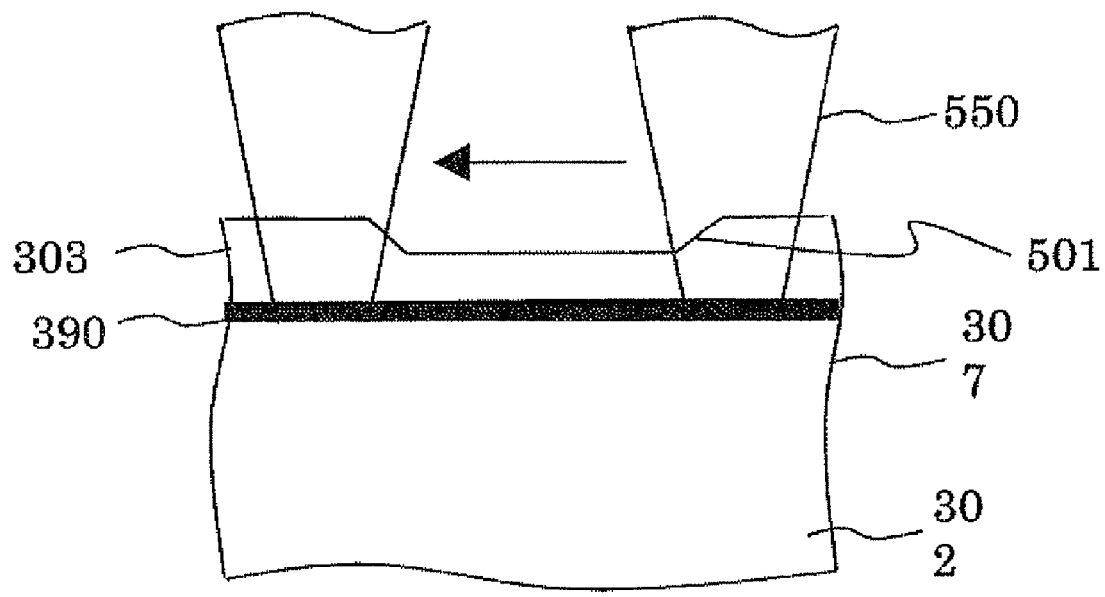
FIG. 12 A cross-section view of the welded part in which the cover and the housing are laser-welded, and a view of the welded part illustrated from a direction along the laser scanning direction according to the fifth embodiment.

A fifth embodiment of the present invention will be described with reference to FIG. 12. FIG. 12 is a cross-section view in a direction along the laser welding line of the laser welded part 390 of the concave part 501 of the front cover 303. In the case in which the concave part 501 is provided in a portion of the laser irradiation part of the front cover 303, a portion in the concave part 501 largely differs in the transmittance from a laser irradiation portion other than the above portion. Further, a polished mirror surface needs to be used as much as possible as a portion on which laser is irradiated. However, it is difficult to change to a mirror surface a vicinity of a boundary between the concave part 501 of the front cover 303 and a thick portion other than the concave part 501, and scattering increases also during the laser welding. Therefore, like FIG. 12, a boundary between the concave part 501 in the direction along the laser welding line and the portion other than the concave part 501 is changed to an inclination part, and thereby a difference between transmittances can be changed gradually. According to the present embodiment, the laser irradiation surface can be changed to a mirror surface, and an effect caused by the difference between the transmittances can be reduced also to the image inspection. An inclination angle is preferably 15 degrees or less. In addition, in the case in which a galvanometer mirror is used in a laser irradiation method, the concave part 501 is inclined also to the irradiation direction side so that the concave part 501 of the front cover 303 is prevented from scattering laser light.

Sixth Embodiment

Figure 13:
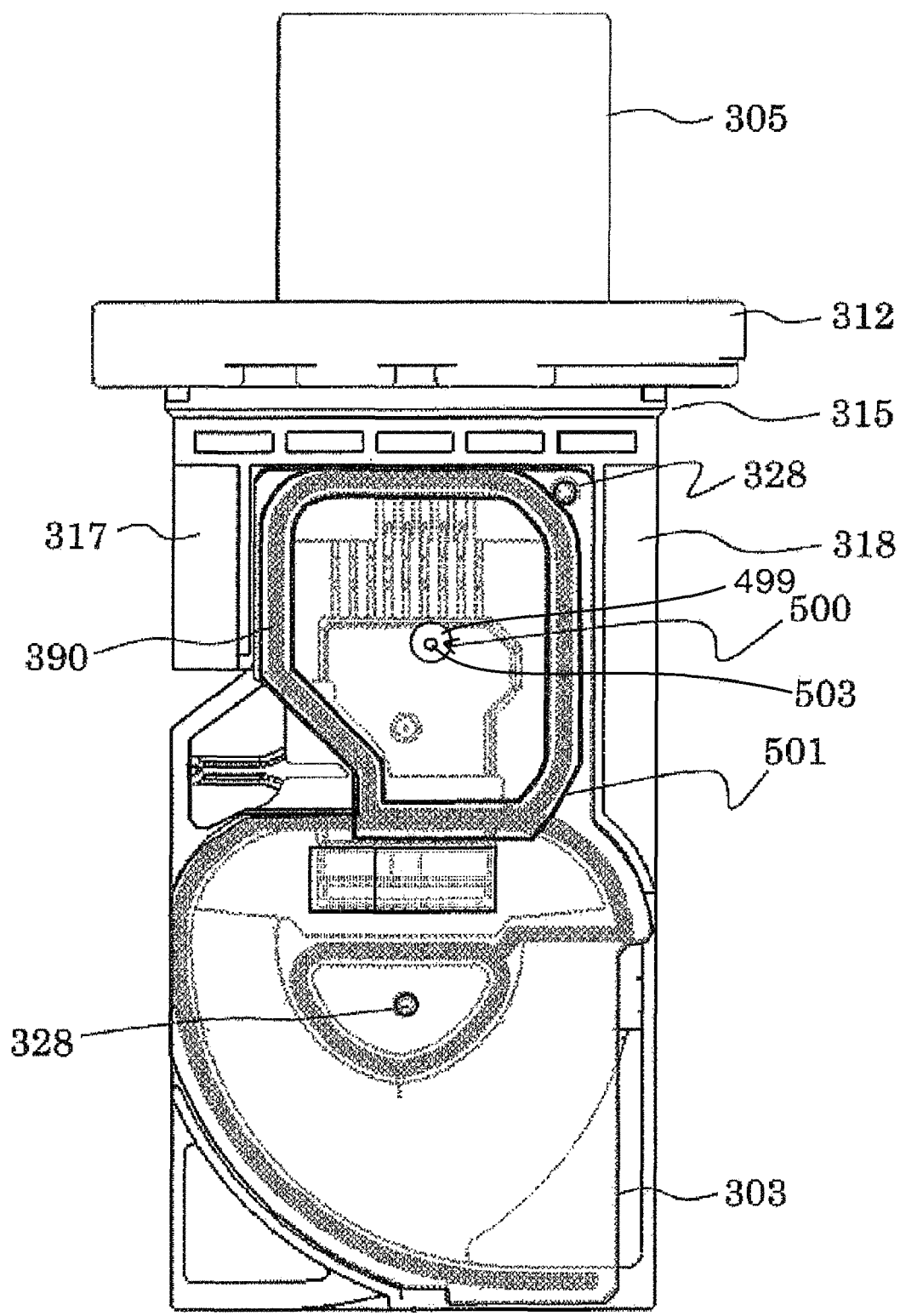
FIG. 13 A front view of the housing of the flow sensor according to a sixth embodiment.

A sixth embodiment will be described with reference to FIG. 13. FIG. 13 is a front view of the housing of the thermal type flow sensor 300. In the first to fifth embodiments, the gate part is set to the side gate. However, a finish work of a gate cut is required in the side gate, and therefore extra costs are required. To cope with the problem, in the present embodiment, the gate part 499, which has a gate cut part 500, is set to a pin gate 503 arranged on a top face of the product, and thereby costs can be reduced. However, when the gate part is set to the pin gate, a molten resin is radially spread, and therefore the pin gage tends to be greater than the side gate in the region in which the transmittance is reduced. In the case of the side gate, the side gate is separated from the gate position by 5 mm, whereas in the case of the pin gate, the pin gate is separated from the gate position by 7 to 9 mm. In consideration of the above point, in the present embodiment, it is sufficient to just provide the gate position in the central part of the circuit chamber in which a shape is relatively isotropic as illustrated in FIG. 13. Further, it is sufficient to just provide a region in which a thickness of the concave part 501 of the front cover 303 is thin in all portions corresponding to the welded part 390 of the circuit chamber. In the case in which the gate part is set to the pin gate, the gate part is automatically cut and a leftover of the gate cutting is generated. Therefore, in consideration of the gate cutting, a thickness of the gate position is preferably thinned.

Seventh Embodiment

Figure 14:
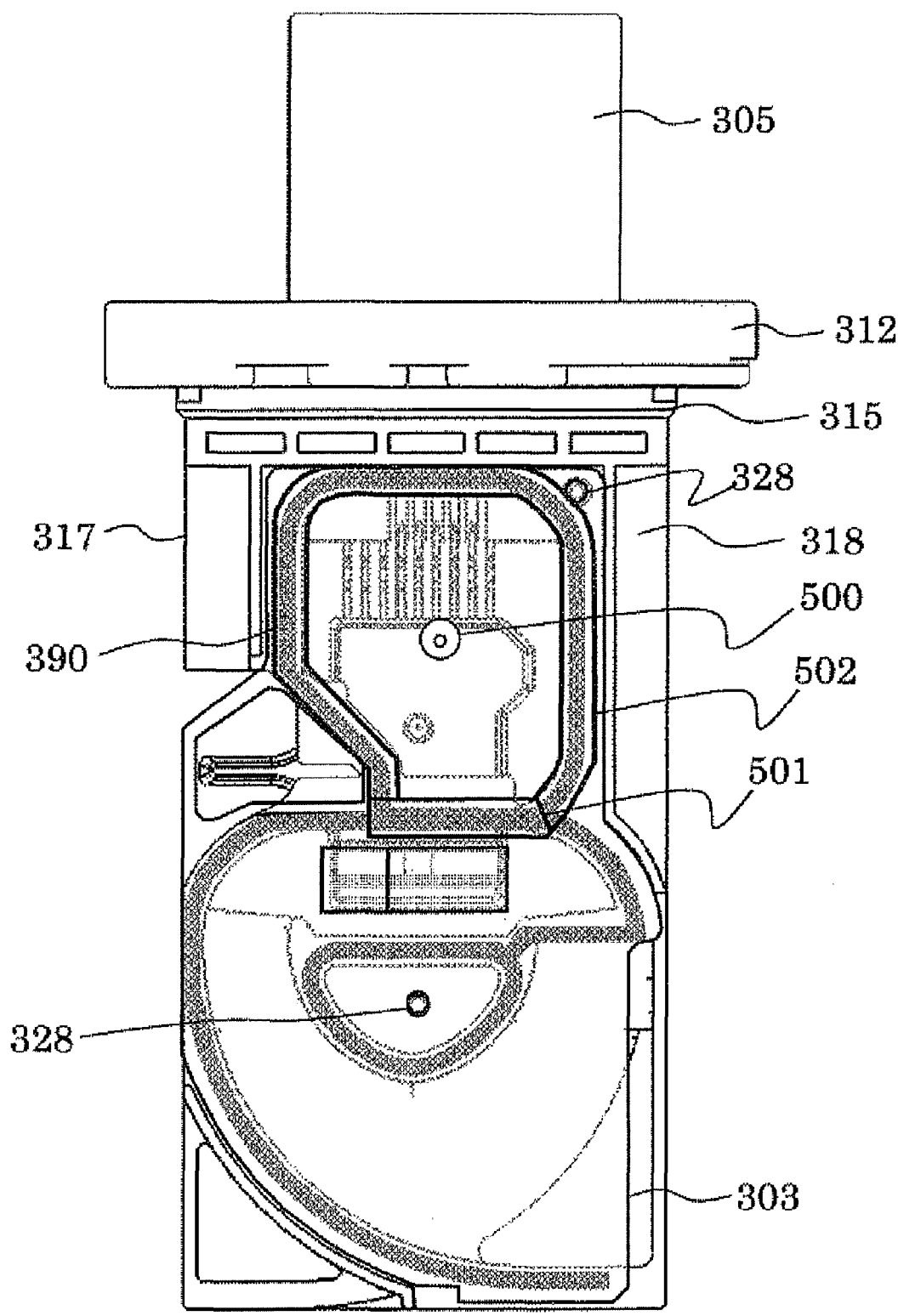
FIG. 14 A front view of the housing of the flow sensor according to a seventh embodiment.

A seventh embodiment will be described with reference to FIG. 14. FIG. 14 is a front view of the housing of the thermal type flow sensor 300. Like a throttle part of the front cover 303, a flow of resins during the molding is deteriorated in a portion in which a thickness is rapidly thickened. Therefore, a common portion of the passage part and the circuit chamber in which the thickness is rapidly thickened tends to be deteriorated more than a portion of the other circuit chamber in the transmittance. To cope with the problem, in the present embodiment, a second concave part 502 is provided in the common portion of the passage part and the circuit chamber of the front cover 303. Further, a thickness of a flat part of the concave part 502 is made to be thinner than the thickness of the concave part 501 formed in the front cover 303 on the circuit chamber side other than the flat part.

Eighth Embodiment

Figure 15:
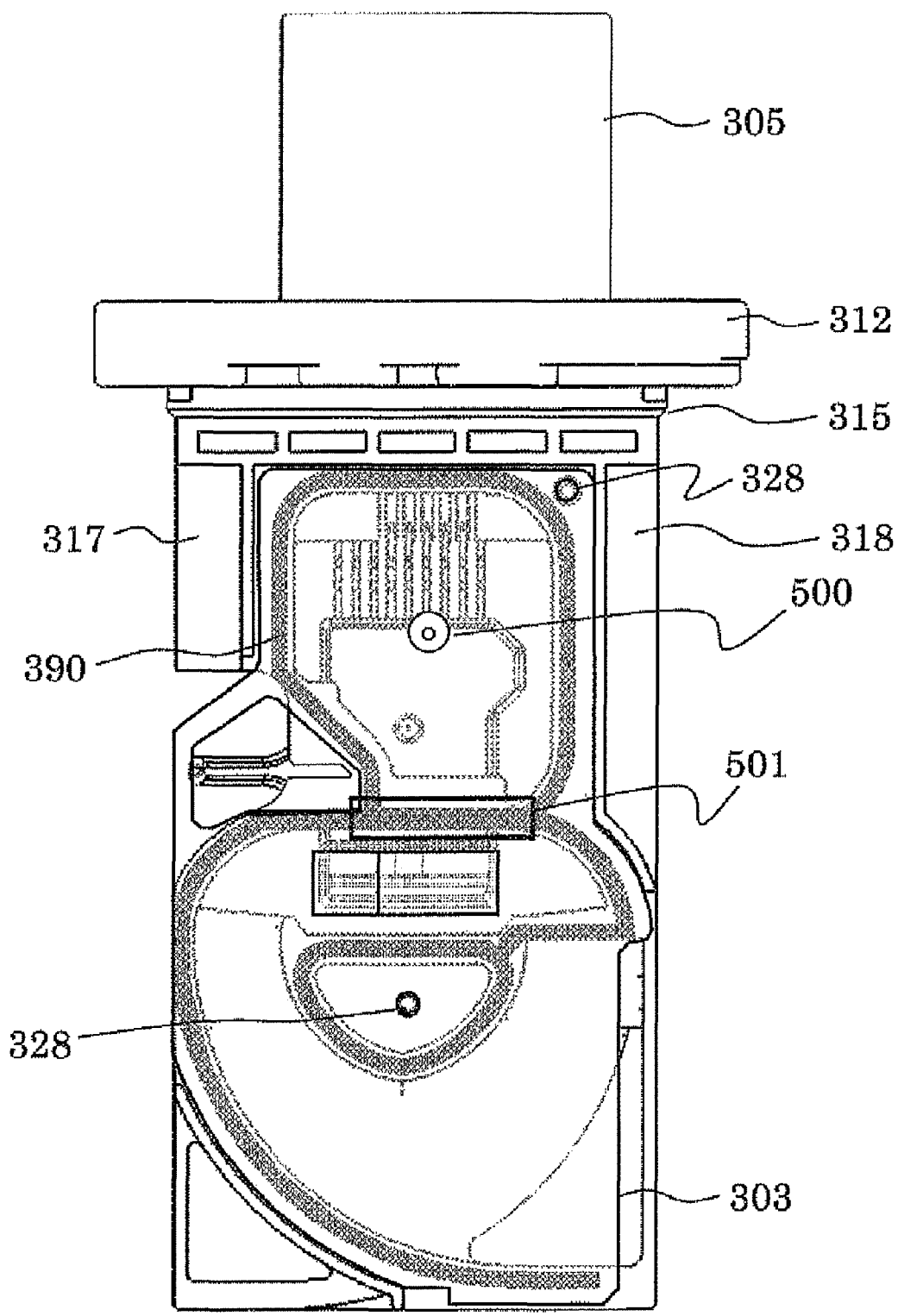
FIG. 15 A front view of the housing of the flow sensor according to an eighth embodiment.

An eighth embodiment will be described with reference to FIG. 15. FIG. 15 is a front view of the housing of the thermal type flow sensor 300. In the case in which the gate position is arranged in the central part of the circuit chamber, the gate position and the welded part can be separated from each other, and therefore the gate position is not provided in all portions of the circuit chamber in some cases. In such a case, like FIG. 15, the concave part 501 may be provided in the laser irradiation surface of the front cover 303 only in the common portion of the circuit chamber and the passage part.

Ninth Embodiment

Figure 16:
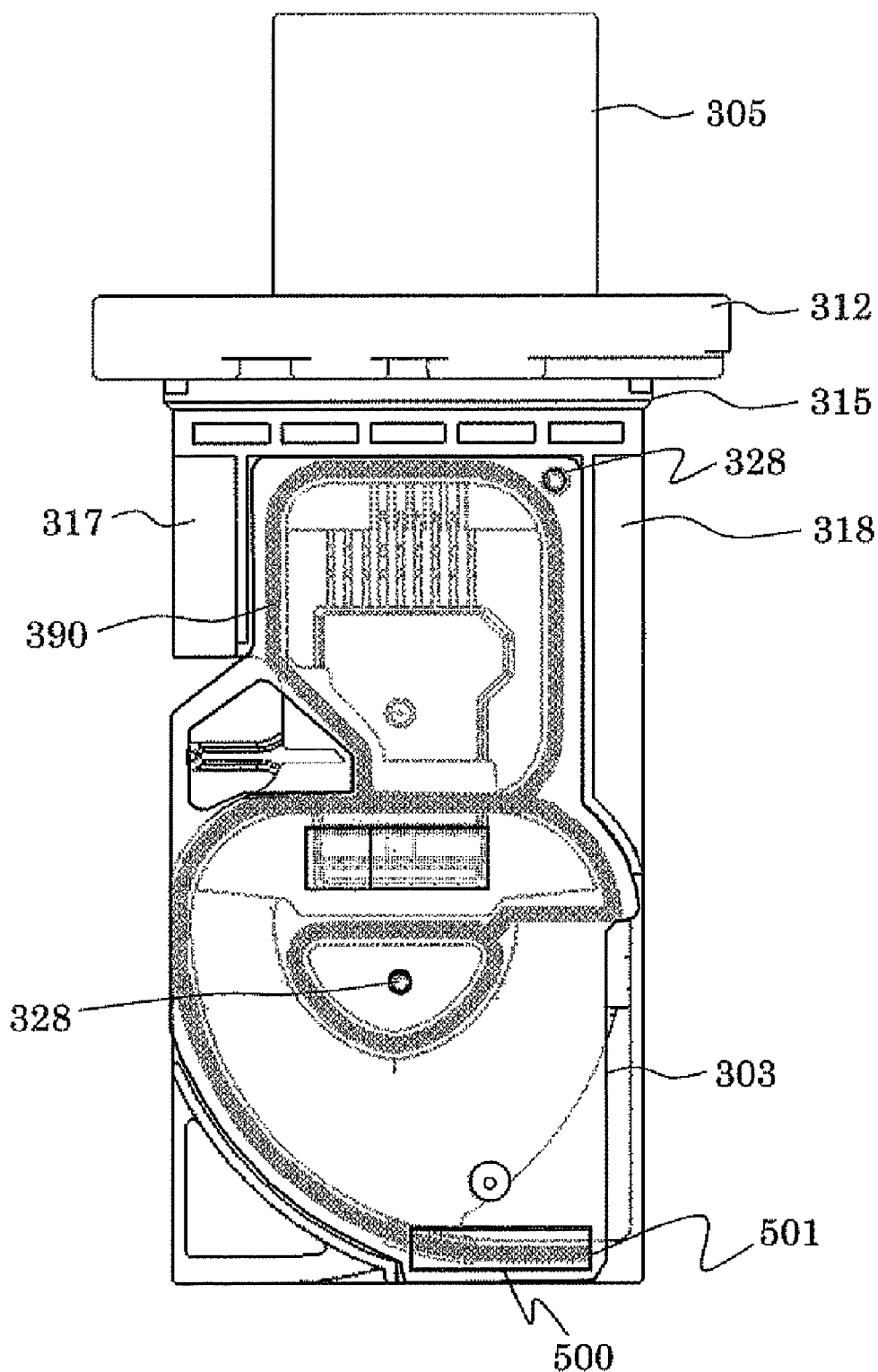
FIG. 16 A front view of the housing of the flow sensor according to a ninth embodiment.

A ninth embodiment will be described with reference to FIG. 16. FIG. 16 is a front view of the housing of the thermal type flow sensor 300. In FIG. 16, a position of the pin gate is provided on the passage part. In the case in which the gate position is set to the side gate, the gate position can be arranged at a portion of the inlet or outlet of the thermal type flow sensor 300 as a position that is relatively separated from the welded part. However, due to variations of a shape of the gate cut part 500, variations may occur in a characteristic itself. However, in the case in which the gate position is set to the pin gate, the gate cut part 500 can be arranged at a position that is not related to a portion through which air flows, only in the thickness direction of the front cover 303. Accordingly, in such a case, the gate position may be arranged on the passage on the outer peripheral side. The reason is that when resins flow in the longitudinal direction as much as possible, a dimensional precision of the front cover 303 is preferable.

Above described above, in any structure, in the case in which the gate position is set to the pin gate, a region tends to increase in which a flat part is provided in which a thickness of the concave part 501 formed in the front cover 303 is thin. Therefore, the burr may be provided in the welded part and a welding area may be increased at the same time. Further, in this structure, any of the laser welded part 390 is formed by lines, and all portions are not necessarily welded relating to the sub-passage part in some cases. In such a case, it is sufficient to just use the concave part 501 formed in the covers 303 and 304 only in a portion in which the welding is partially made. In the invention, most of descriptions are heretofore made with reference to figures from the front cover 303 side, and further the same configuration is formed also relating to figures from the rear cover 304 side. Further, the gate position is described in the case of only one place, and further the gate position may be arranged in plurality. In this case, the number of the concave parts 501 formed in the covers 303 and 304 preferably corresponds to the number of the gate positions.

In addition, the present invention can be used for applications of products in which problems are analogous other than the thermal type flow sensor and the present invention can be adopted for the laser welding of general thermoplastic resins. Amorphous resins of the thermoplastic resins include polystyrene (PS), acrylonitrile-styrene (AS), acrylonitrile-butadiene-styrene copolymer (ABS), polyetherimide (PEI), polycarbonate (PC), polyarylate (PAR), polymethylmethacrylate (PMMA), cycloolefin polymer (COP), cycloolefin copolymer (COC), polysulfone (PSF), polyether sulfone (PES), polyvinyl chloride (PVC), and polyvinylidene chloride (PVDC). Other than the above, the crystalline resins include polyethylene (PE), polypropylene (PP), polyoxymethylene (POM), polyethylene terephthalate (PET), polytrimethylene terephthalate (PTT), polyethylenenaphthalate (PEN), polyether ether ketone (PEEK), liquid crystal polymer (LCP), and polytetrafluoroethylene (PTFE). Further, the crystalline resins include their alloy materials, an inorganic material such as glass fiber, and a thermoplastic resin including particular addition agents. Generally, an amorphous resin is excellent in moldability or transparency whereas a crystalline resin is excellent in heat resistance or chemical resistance. Further, the present invention may be applied to not only a thermoplastic resin but also an epoxy-based thermosetting resin.

REFERENCE SIGNS LIST

24 Exhaust air
30 Gas to be measured
110 Internal combustion engine
112 Engine cylinder
114 Engine piston
116 Intake valve
118 Exhaust valve
122 Air cleaner
124 Main passage
126 Throttle body
128 Intake manifold
132 Throttle valve
144 Angle sensor
146 Rotation angle sensor
148 Oxygen sensor
152 Fuel injection valve
154 Spark plug
156 Idle air control valve
200 Control device
300 Thermal type flow sensor
302 Housing
303 Front cover
304 Rear cover
305 External connection part
306 Sub-passage groove
307 Projecting part for laser welding
308 Concave part of joining surface
310 Measuring unit
312 Flange
315 Thermal insulating part
317 Upstream projection
318 Downstream projection
320 Terminal connection part
322 Protection part
324 Knockout pin
326 Insertion hole
328 Aligning part
341 Downstream part
342 Upstream part
343 Inlet
350 Inlet
351 Inlet groove
353 Outlet groove
356 Projecting part
361 External terminal inner edge
380 Projecting part
381 Projecting part
382 Hollow part
386 Front-side flow passage
387 Rear-side flow passage
390 Laser welded part
400 Circuit package
412 Connection terminal
430 Measuring flow passage surface
431 Rear measuring flow passage surface
436 Heat transfer surface exposed part
438 Opening
452 Temperature detection unit
499 Gate part
500 Gate cut part
501 Concave part of laser irradiation surface
502 Second concave part of laser irradiation surface
503 Pin gate
550 Laser light
602 Flow rate detection unit

The invention claimed is:

1. A flow sensor comprising:
a housing;
a cover;
a circuit chamber that is sealed between the housing and the cover and has electronic components and wiring parts built-in; and
a sub-passage part through which a fluid flows that is to be detected, wherein
near a gate part of the cover, a thickness of a part of a portion that is laser-welded with the housing by laser light is thinner than a thickness of another portion.

2. The flow sensor according to claim 1, wherein
a laser transmittance of a laser-welded portion of the cover is 35% or more in any wavelength of visible light.

3. The flow sensor according to claim 2, wherein
a laser transmittance of a portion that is not laser-welded of the cover is 20% or less in any wavelength of visible light.

4. The flow sensor according to claim 1, wherein
the cover includes a concave part on a side on which laser is incident, and
a width of a bottom surface part of the concave part of the laser-welded portion is greater than a spot diameter of the laser light and a projecting width of the housing.

5. The flow sensor according to claim 1, wherein
the cover includes a concave part on a welding surface side, and
the width of the bottom surface part of the concave part is greater than the spot diameter of the laser light and the projecting width of the housing.

6. The flow sensor according to claim 1, wherein
at least in a laser welded part near the gate part, a burr is formed.

7. The flow sensor according to claim 6, wherein
a spot size of incident laser light is greater than the width of the projecting part formed on the housing.

8. The flow sensor according to claim 6, wherein
at least the burr of the laser welded part formed on the sub-passage part is stored in the concave part of the cover.

9. The flow sensor according to claim 1, wherein
a welding width of the laser welded part near the gate part of the cover is greater than a welding width of another laser welded part.

10. The flow sensor according to claim 1, wherein
an inclination is provided on ends of the concave part.

11. The flow sensor according to claim 1, wherein
the gate part of the cover is set to a pin gate, and
a gate position of the cover is provided near a center of the circuit chamber.

12. The flow sensor according to claim 1, wherein
the gate part of the cover is set to the pin gate, and
a gate position of the cover is provided near an outer peripheral side-sub passage part.

13. The flow sensor according to claim 1, wherein
the gate part of the cover is set to a side gate, and the gate position of the cover is provided in the outer peripheral side-sub passage part.

14. The flow sensor according to claim 1, wherein
the gate part of the cover is set to the side gate, and
a gate position of the cover is provided on a flange side.

15. The flow sensor according to claim 1, wherein
based on a transmittance of the cover corresponding to the laser welded part, a portion in which a thickness is different is present in plurality.

16. The flow sensor according to claim 1, wherein
an addition rate of glass fiber of a material of the cover is smaller than an addition rate of glass fiber of a material of the housing.

17. The flow sensor according to claim 1, wherein
a crystallinity of the material of the cover is smaller than a crystallinity of the material of the housing.

18. The flow sensor according to claim 1, wherein
an elastic modulus of a portion near the gate part of the cover is greater than an elastic modulus of another portion of the cover.

* * * * *